United States Patent
Miller

[19]

[11] Patent Number: 5,853,593
[45] Date of Patent: Dec. 29, 1998

[54] FILTRATION METHOD FOR METAL WORKING WASTE WATER

[75] Inventor: Rhonda Miller, Willoughby Hills, Ohio

[73] Assignee: Eaton Corporation, Cleveland, Ohio

[21] Appl. No.: 646,406

[22] Filed: May 7, 1996

[51] Int. Cl.[6] ................................................. B01D 61/00
[52] U.S. Cl. ........................... 210/652; 210/651; 210/641; 210/701; 210/774
[58] Field of Search ..................... 210/652, 641, 210/653, 651, 257.2, 195.2, 701, 774; 703/733

[56] References Cited

U.S. PATENT DOCUMENTS

| | | | |
|---|---|---|---|
| 3,541,059 | 11/1970 | Schaper ................................. | 210/733 |
| 3,617,553 | 11/1971 | Westaway et al. .................... | 210/651 |
| 4,014,787 | 3/1977 | Shorr .................................... | 210/651 |
| 4,029,577 | 6/1977 | Godlewski et al. ................... | 210/701 |
| 4,326,980 | 4/1982 | Snyder et al. ......................... | 210/701 |
| 4,806,244 | 2/1989 | Guilhem ................................ | 210/638 |
| 4,872,991 | 10/1989 | Bartels et al. ......................... | 210/651 |
| 4,981,594 | 1/1991 | Jones .................................... | 210/644 |
| 5,137,654 | 8/1992 | Burke .................................... | 210/652 |
| 5,234,583 | 8/1993 | Cluff ..................................... | 210/169 |
| 5,254,257 | 10/1993 | Brigano et al. ........................ | 210/639 |
| 5,320,755 | 6/1994 | Hagqvist et al. ...................... | 210/652 |
| 5,338,553 | 8/1994 | Johnson et al. ....................... | 426/36 |
| 5,368,779 | 11/1994 | Snethen ................................. | 210/733 |
| 5,372,723 | 12/1994 | de Geus et al. ....................... | 210/652 |
| 5,409,613 | 4/1995 | Weaver ................................. | 210/652 |
| 5,439,592 | 8/1995 | Bellos et al. .......................... | 210/652 |
| 5,454,952 | 10/1995 | Brewer .................................. | 210/651 |
| 5,460,723 | 10/1995 | Bourbigot et al. .................... | 210/650 |
| 5,501,798 | 3/1996 | Al-Samadi et al. ................... | 210/652 |

FOREIGN PATENT DOCUMENTS 06914  2/1975  Japan ..................................... 210/733

OTHER PUBLICATIONS

"Reverse Osmosis ", Wes Byrne, Published 1995 by Tall Oaks Publishing Inc., pp. 21–23, 137 and 223.

Primary Examiner—Ana Fortuna
Attorney, Agent, or Firm—Daniel S. Kalka; Albert E. Chrow

[57] ABSTRACT

A method is provided for filtering waste water containing metallic cations having valences in whole integers of at least two in concentrations greater than about one part to about one million parts of the metalworking waste water. The method utilizes an ultrafilter (6) in series with a nanofilter (14) and the addition of a chemical dispersant effective to render the nanofilter permeate suitable to meet applicable environmental standards for discard into streams, lakes and sanitary sewers.

4 Claims, 1 Drawing Sheet

FILTRATION METHOD FOR METAL WORKING WASTE WATER

INTRODUCTION

This invention relates generally to a method for filtering metalworking waste water for disposal into sanitary sewers, streams, lakes or the like and, more particularly, to a method and apparatus employing an ultrafilter, a nanofilter and a chemical dispersant for treating metalworking waste water containing concentrations of metallic cations greater than one part per million parts of the metalworking waste water and render it suitable under applicable environmental standards for disposal into sanitary sewers, streams, lakes or the like.

BACKGROUND OF THE INVENTION

Microfilters, ultrafilters, nanofilters and reverse osmosis filters have for some time been utilized to separate particulates from waste water prior to disposal into sanitary sewers, streams, lakes or the like and, in certain situations, have been employed in various combinations.

The present invention focuses on a particular combination of an ultrafilter and a nanofilter that, in combination with a chemical dispersant, is operative to render metalworking waste water containing metallic cations having a valence in whole integers of at least two and present at more than one part per million parts of the waste water suitable under applicable environmental standards for disposal into sanitary sewers, streams and lakes or the like, discrediting the current belief by those ordinarily skilled in the art of waste water treatment that oxidation and sand filtration must be employed where such metallic cation concentrations are greater than one part per million. Such is taught, for example, on pages 21 and 22 of Chapter 1 of "Reverse Osmosis" by Wes Byrne, published in 1995 by Tall Oaks Publishing, Inc., in which it is disclosed that other means of filtration should be employed where iron or manganese concentration is greater than 0.05 milligrams per liter, and on page 137 of Chapter 3, that the particulates should be oxidized to an insoluble state and filtered by green sand or the like.

In U.S. Pat. No. 5,338,553, microfilters are adapted to separate colloidal and suspended particles in the size range of about 0.05 to about 10 microns, employ ceramic and/or polymeric membranes, operate at an input pressure of 30 psi or less, and are generally employed to clarify dextrose and to sterilize water. Suitable polymeric membranes include cellulose acetates, polyvinyl chlorides, polyamides, polysulfones, polyethersulfones and the like.

Reverse osmosis filters, sometimes called hyperfilters, are also described in U.S. Pat. No. 5,338,553 as effective in separating relatively smaller components having a molecular weight of less than about 500, operate at an input pressure of from about 150 psi to 600 psi at temperatures of from about 0° C. to about 50° C., and are particularly helpful in the dewatering of whey and in the desalination of sea water.

Ultrafilter membranes have a pore size ranging from about 0.0015 to about 0.2 micrometers and are able to separate molecules having molecular weights in the range of about 300 to about 300,000 and operate at an input pressure of about 15 psi to about 200 psi.

Nanofilter membranes have a pore size on the order of about 10 angstroms, retain particles that have a molecular weight of greater than 200 to 400, and operate at an input pressure of from about 100 to about 600 psi.

One example of a nanofilter reclaiming spent brine is disclosed in U.S. Pat. No. 5,254,257, the disclosure of which is incorporated herein by reference.

An application in which either an ultrafilter or a nanofilter or a reverse osmosis filter may be employed to purify water is disclosed in U.S. Pat. No. 5,320,755, the disclosure of which is incorporated herein by reference.

The combination of an ultrafilter membrane and nanofilter membrane for removing ash from a sugar solution is described in U.S. Pat. No. 5,454,952, the disclosure of which is incorporated herein by reference.

The use of a nanofilter and/or reverse osmosis system for filtering swimming pool water is described in U.S. Pat. No. 5,234,583, the disclosure of which is incorporated herein by reference.

The use of a microfilter alone or in combination with either a nanofilter or a reverse osmosis filter for treating water from cheese making operations is disclosed in earlier-described U.S. Pat. No. 5,338,553, the disclosure of which is incorporated herein by reference.

Machining operations such as metal cutting, grinding or cleaning operations typically use water emulsifiable and soluble cutting and lubricating fluids that, after use, ultimately results in generation of a metalworking fluid waste water. As such, metalworking waste water characteristically contains water-emulsifiable oils, tramp oil, alkaline cleaners and miscellaneous waste water, as well as organo-metallic complexes. These complexes are comprised of water-soluble organic compound(s) originating from the water-emulsifiable oils, corrosion resistant chemical products, wear reducing additives and metallic cations, commonly iron cations, that are assumed to be ionically bound to the organic compounds.

Since such organic compounds and organo-metallic complexes are known to be oxygen scavengers, it is undesirable to discard them into streams and the like because of the effect they may have on marine plant and animal life.

The filtration process of the present invention specifically targets reduction of oxygen scavengers as measured by chemical oxygen demand (COD) and the total organic carbon (TOC) and the biochemical oxygen demand-five day ($BOD_5$) in the waste water, rendering it environmentally suitable for discard into sanitary sewers, streams, lakes and the like.

The soluble organic compounds in metalworking fluids that have been identified as causing elevated COD, TOC, and $BOD_5$ values are mono-, di-, and tri-ethanolamines, glycol ethers and fatty acids such as oleic fatty acid (C18:1), and soaps. Such compounds are also found in wear-reducing additives, corrosion inhibitors and surfactants and, thus, may be found in metalworking waste streams, and all are able to pass through an ultrafilter membrane having a molecular weight cut-off of 50,000 or higher.

Since the soluble organic compounds that are present in metalworking waste water can pass through an ultrafilter membrane, the discharge may exceed applicable federal, state, or city-established limits without further treatment.

As earlier described, the present invention employs a nanofilter in combination with an ultrafilter with the addition of a chemical dispersant to address the problem of removing soluble organic compounds from metalworking waste water.

The machining of metal in the presence of a water emulsifiable or soluble metalworking fluid characteristically results in the generation of metallic cations having valences in whole integers of two or higher, such as in the production of $Fe^{++}$, or $Fe^{+++}$ cations during the working of an iron based metal, which is theorized to bond ionically to the organic compound(s) present in the metalworking fluids to form the organo-metallic complexes previously described.

Metalworking waste water is illustrated as characteristically comprising a mixture of water emulsifiable and soluble cutting and lubricating fluids, alkaline cleaners, and miscellaneous waste water and tramp oil. In instances where the water emulsifiable and soluble metalworking fluids are being used in cast iron machining operations, the divalent and trivalent iron cations can initially be as high as from about 4 to about 30 parts per million parts of the metalworking waste water feed stream to the nanofilter (following pre-treatment with an ultrafilter) and, when combined as organo-metallic complexes with the soluble organic compounds that are also present in ultrafilter permeate present in the metalworking fluid waste water, tend to foul and clog nanofilter membranes being used as filters in less than three hours and thus greatly impair filtering flux rate (typically measured in gallons per square foot of membrane surface area per day).

Furthermore, concentration polarization may occur at the surface of the nanofilter membrane. This describes the observation in cross-flow filtration systems where the concentration of the retained filtrate species, of relevance in this case iron, is higher adjacent to the membrane surface than in the bulk feed stream. Concentration polarization encourages chemical reactions, including, precipitation, on the surface of the membrane than can lead to severe fouling of the membrane as measured by loss of efficiency as measured by flux rate.

Although it is known to use chemical dispersants to separate metallic cations from organo-metallic complexes, it has heretofore been believed by those skilled in the art of metalworking fluid filtration that metallic cations, particularly iron cations having valences in whole integers of two or more (such as $Fe^{++}$ and $Fe^{+++}$), must be filtered out by means other than a nanofilter membrane (such as by oxidation and sand filtration) when present in concentrations greater than one part of the metallic cation per million parts of the dispersed fluid.

It has now been discovered that such is not the case and that the combination of an ultrafilter and a nanofilter with the introduction of chemical dispersant(s) is highly effective in treating metalworking waste water containing metallic cations having valences of two or higher in concentrations greater than one part per million parts of the waste water.

SUMMARY OF SOME PREFERRED EMBODIMENTS

Figure 1:
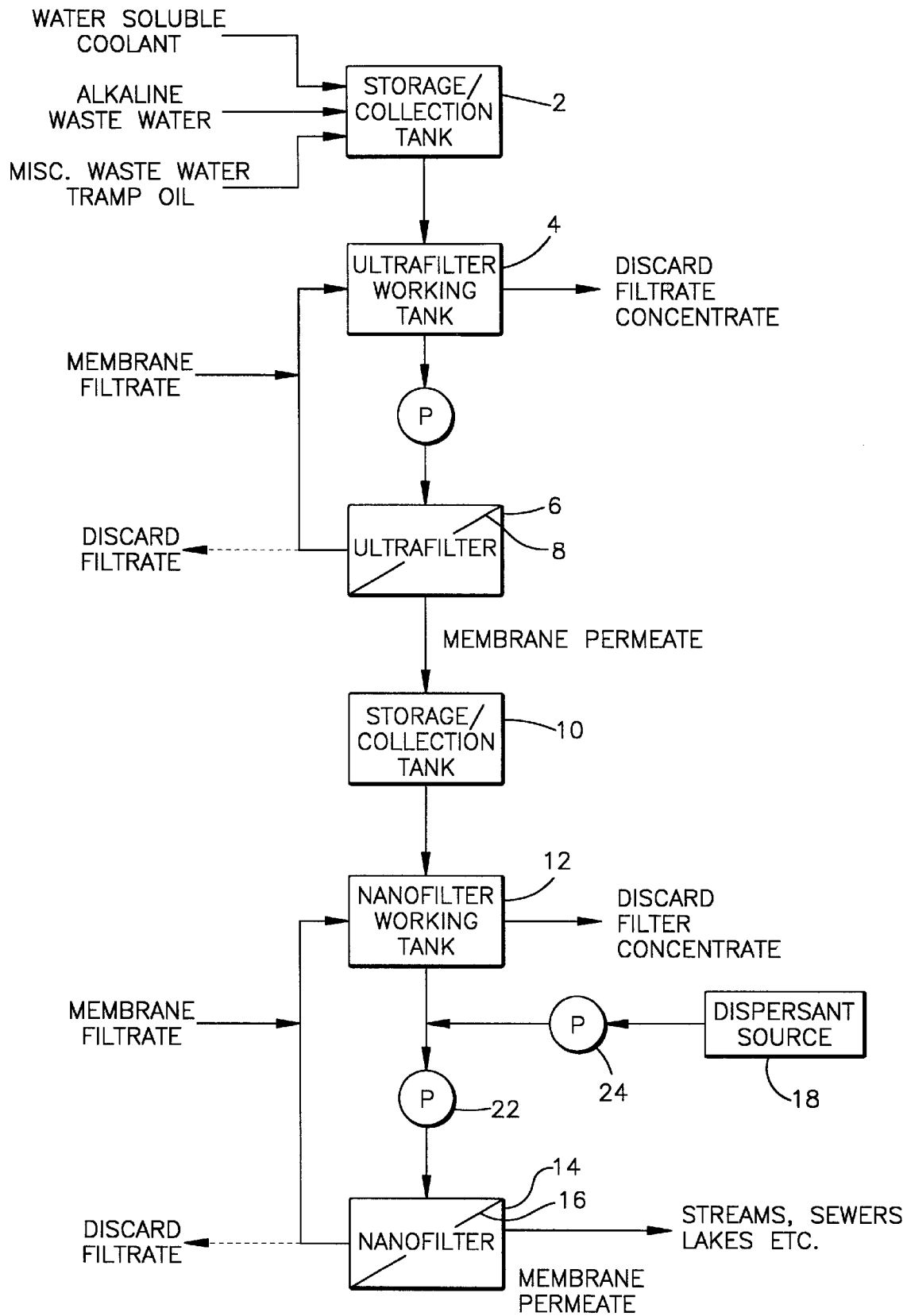
FIG. 1 is a block diagram of an embodiment of apparatus employed in the filtration method of the invention.

In FIG. 1, the metalworking waste water is illustrated as characteristically comprising a mixture of water emulsifiable and soluble cutting and lubricating fluids, alkaline cleaners, and miscellaneous waste water. The method and apparatus of the present invention preferably includes a storage or collection tank 2 that receives and holds the metalworking waste water prior to its being transferred by suitable means, such as a pump or by gravity, with an ultrafilter working tank referenced by numeral 4.

The metalworking waste water is transferred under pressure through an ultrafilter 6 having a plurality of ultrafilter membranes 8, in series or parallel that, as previously described, are effective in removing tramp oil, organic compounds and organo-metallic complexes having a molecular weight above a certain minimum.

Ultrafilter membranes have a pore size generally ranging from about 0.0015 micrometers to about 0.2 micrometers and have the ability to retain as filtrate molecules having a molecular weight of from about 300 to about 300,000. A preferred ultrafilter membrane pore size for use in conjunction with a nanofilter in the present invention is about 0.005 micrometers and has the ability to retain as filtrate molecules having molecular weights above about 50,000.

The metalworking waste water is pressurized by a suitable pump, referenced by numeral 20, to a desired ultrafilter inlet pressure in the range of from about 15 psi to about 200 psi.

Although the ultrafilter filtrate may be discarded directly by hauling or the like to an authorized disposal site (as shown by the dashed arrow), it is preferably transferred by suitable means, such as by pressure or gravity, back to working tank 4 to mix with the incoming metalworking waste water and then settle and be removed as a concentrate for discard such as by hauling to an authorized disposal location.

A preferred ultrafilter membrane material having a pore size of about 0.005 micrometers is made from polysulfone and can be purchased from Koch Membrane Systems Inc. and Osmonics Inc. and others. Such membranes can either be of the tubular, hollow fiber, flat plate or spiral configuration.

Use of such membranes in series or parallel for filtering metalworking waste water exhibits an initial increase in flux when pressure is increased, but then the flux rate levels off and becomes independent of pressure because concentration polarization occurs.

The ultrafilter filtrate comprises tramp oil and soluble organic compounds and organo-metallic complexes having a molecular weight greater than about 50,000. The permeate (that material passing through the ultrafilter membrane) ordinarily comprises waste water and soluble organic compounds and organo-metallic complexes having a molecular weight less than about 50,000.

Although the ultrafilter permeate may be transferred by suitable means from ultrafilter 6 to a nanofilter working tank 12, it is preferably first transferred to a nanofilter storage or collection tank 10 and then into nanofilter working tank 12.

The ultrafilter permeate is transferred under pressure from working tank 12 into a nanofilter 14 having a plurality of nanofilter membranes that can either be in parallel or series, referenced by numeral 16.

The ultrafilter permeate is pressurized by means of a suitable pump 22 to a desired pressure range of from about 150 psi to about 350 psi for this particular unit and more preferably from about 170 psi to about 300 psi. A nanofilter having three membranes in series having a respective pore size of about 10 angstroms is able to reject or filter out molecules having a molecular weight as low as about 200 to about 400 from metalworking waste water at an inlet pressure of about 180 psi and an outlet pressure of about 150 psi with a pressure drop of about 10 psi across each membrane.

The nanofilter membranes for use in the present invention are preferably polyamide membranes having an anionic (negative) surface charge that can be purchased from Dow Chemical Company as Filmtec NF45-3838/30.

A chemical dispersant is transferred from a source 18 by means of a suitable pump 24 or other suitable metering means into the ultrafilter permeate prior to its entrance into nanofilter 14.

An effective dispersant for metalworking waste water for the present invention has been found to be a 35-part acrylate copolymer/65-part water mixture sold under No. 2025 by Betz Industrial Company.

The dispersant-water solution is metered into the ultrafilter permeate at a range of from about 1 part solution to about 700–3,000 parts ultrafilter permeate and more preferably at about 1 part solution to about 2,700 parts ultrafilter permeate.

Although the nanofilter filtrate may be discarded directly by hauling or the like to an authorized disposal location (as shown by the dashed arrow), it is preferably transferred by suitable means, such as by pump or gravity, back into working tank 12 and then discarded as a filtrate concentrate by suitable means, such as by evaporation.

The nanofilter filtrate characteristically comprises waste water and soluble organic compounds having a molecular weight down to about 200 to 400 and metallic cations having valences in whole integers of at least 2, whereas the nanofilter permeate characteristically contains waste water and organic compounds having a molecular weight less than about 200 and monovalent metallic cations which in combination are usually able to be discarded into streams, lakes or sanitary sewers without known deleterious effect.

It is to be understood that, although shown as arrows in FIG. 1, the metalworking waste water is transferred between the various tanks and filters by means of pipes or troughs or the like, depending upon whether or not it is pressurized.

By way of example, the flow rates in TABLE I were exhibited over the time indicated for metalworking waste water containing initially from about 7 parts to about 15 parts iron cations having a valence in whole integers of at least 2, and in the presence of other metallic cations including manganese and magnesium, and dispersant conditions:

|  | Ultrafilter | Nanofilter |
| --- | --- | --- |
| Filter type | Hollow fiber polysulfone | Spiral wound polyamide |
| Pore size | 0.005 micrometers | 1 nanometer |
| Number of filters (series) | 6 (parallel) | 2 parallel, 3 series (6 total) |
| Inlet pressure | 30 psi | 180 psi |
| Outlet pressure | 10 psi | 150 psi |
| Dispersant type: Betz Water Management, Betz 2025 | | |
| Dispersant Betz 2025 dosage at 0.1% by volume of metalworking waste water. | | |

TABLE I

| Time | TRIAL 1 | TRIAL 2 | TRIAL 3 | TRIAL 4 |
| --- | --- | --- | --- | --- |
|  | Flow rate (gallons per minute through nanofilter modules) | | | |
| (minutes) | Without dispersant | | With dispersant | |
| 1 | 6.8 | 7.5 | 9.0 | 7.2 |
| 30 | 6.5 | 4.75 | 8.3 | 6.5 |
| 60 | 6.0 | 4.25 | 8.1 | 6.25 |
| 90 | 5.4 | 4.0 | 8.0 | 6.2 |
| 120 | 4.75 | 3.9 | 7.8 | 6.0 |
| 150 | 4.10 | 3.75 | 7.75 | 5.9 |
| 180 | 3.50 | 3.0 | 7.6 | 5.5 |
| 210 | 3.25 | 2.50 | 7.5 | 5.5 |
| 240 | 2.9 | N/A | 7.4 | N/A |
| 270 | 2.75 | N/A | 7.25 | N/A |
| 300 | 2.40 | N/A | 7.10 | N/A |
| 330 | 2.20 | N/A | 7.20 | N/A |
| 360 | 2.25 | N/A | 7.30 | N/A |

TABLE I-continued

| Time | TRIAL 1 | TRIAL 2 | TRIAL 3 | TRIAL 4 |
| --- | --- | --- | --- | --- |
|  | Flow rate (gallons per minute through nanofilter modules) | | | |
| (minutes) | Without dispersant | | With dispersant | |
| 390 | 1.75 | N/A | 7.50 | N/A |
| 400 | 1.50 | N/A | 7.25 | N/A |
| IRON CONC. (initial) | 7.2 MG/L | 15.3 MG/L | 9.0 MG/L | 7.4 MG/L |
| IRON CONC. (final) | 10.7 MG/L | 84 MG/L | 17.9 MG/L | 21.5 MG/L |

The foregoing clearly indicates that the dispersant is highly effective in preventing the nanofilter membranes from fouling or clogging in instances where the metallic cation concentration for valences of two or higher is higher than the one part per million parts of metalworking waste water heretofore believed to be the highest concentration permissible for effective use of a nanofilter. Furthermore, due to concentration polarization, the iron concentration at the surface of the membrane is likely to be much more concentrated than the final iron concentrations in the bulk solution.

What is claimed is:

1. A method for treating waste water containing free and emulsifiable oils, metalworking fluids and water-soluble organo-metallic complexes of water-soluble organic compounds bound to metallic cations present in an amount greater than one part per million of the cation per part of the waste water, said metallic cations having a valence in whole integers of at least two, and said method including the steps of:

(a) passing the waste water through at least one ultrafiltration membrane operative to separate the free and emulsifiable oils and metalworking fluids from the waste water as an ultrafilter waste water filtrate therefrom and enable the remaining waste water to pass as an ultrafilter waste water permeate therethrough;

(b) disposing of the ultrafilter waste water filtrate of step (a);

(c) introducing a dispersant water solution into the ultrafilter waste water permeate of step (a) at a range by volume of about 1 part of the solution to from about 700 to about 3,000 parts of the ultrafilter permeate effective to provide a dispersed ultrafilter waste water permeate having the metallic cations and soluble organic compounds separately held in solution;

(d) passing the dispersed ultrafilter waste water permeate of step (c) through at least one nanofilter membrane operative to separate the metallic cations and soluble organic compounds as a nanofilter waste water filtrate therefrom and enable the remaining ultrafilter waste water permeate to pass as a nanofilter waste water permeate therethrough for disposal in sanitary sewers, streams, lakes or the like; and (e) disposing of the nanofilter waste water filtrate of step (d).

2. The method of claim 1 wherein the metallic cations are iron cations.

3. The method of claim 1 wherein the metallic cations' valence integers are two and three.

4. The method of claim 1 wherein the nanofilter waste water filtrate of step (e) is concentrated by evaporation.

\* \* \* \* \*